D. D. Gitt.
Running-Gear for Vehicles.
N° 73444 Patented Jan. 21, 1868.
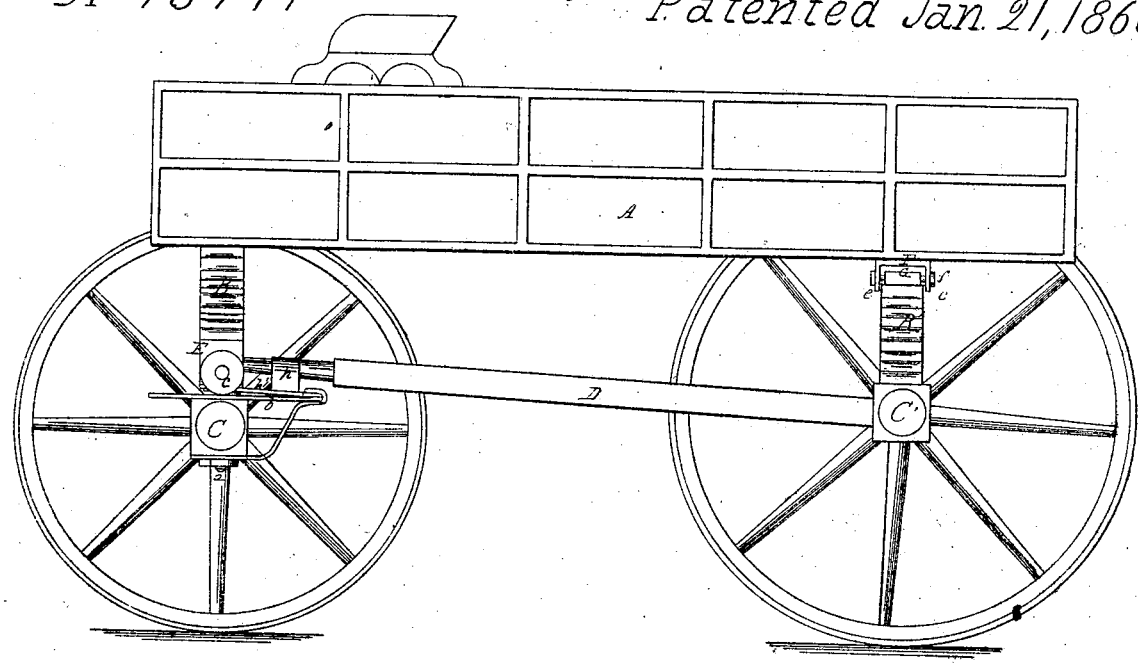
Fig. 1
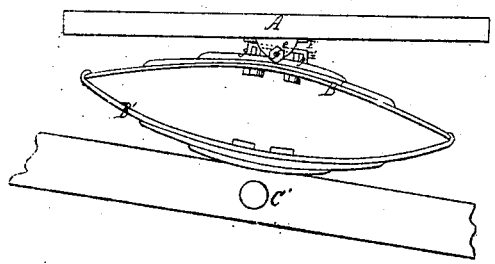
Fig. 2
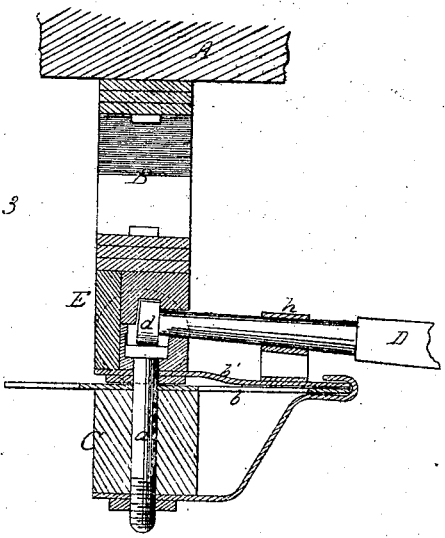
Fig. 3
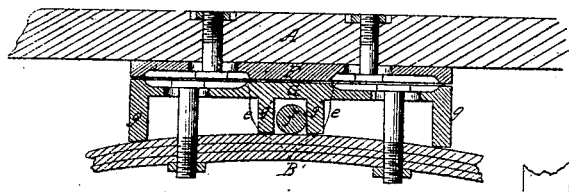
Fig. 4
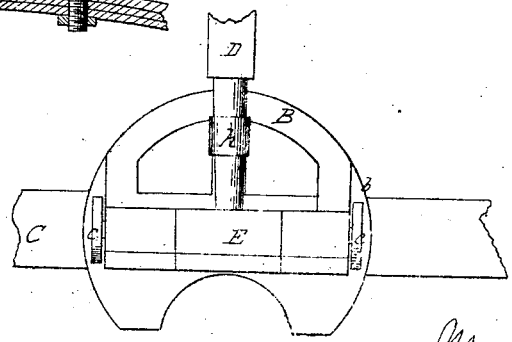
Witnesses
Inventor
D. D. Gitt

United States Patent Office.

DANIEL D. GITT, OF ARENDTSVILLE, PENNSYLVANIA.

Letters Patent No. 73,444, dated January 21, 1868.

---

IMPROVEMENT IN RUNNING-GEAR FOR VEHICLES.

---

The Schedule referred to in these Letters Patent and making part of the same.

---

TO ALL WHOM IT MAY CONCERN:

Be it known that I, DANIEL D. GITT, of Arendtsville, in the county of Adams, and State of Pennsylvania, have invented certain new and useful Improvements in Running-Gear for Vehicles; and I do hereby declare that the following is a full, clear, and exact description thereof, reference being had to the accompanying drawings, making part of this specification, in which—

Figure 1 is an elevation of one side of a wagon, with two wheels removed, to show the improvements.

Figure 2 shows the manner of attaching the rear end of the wagon-body to the rear spring, by a loose pivot-joint.

Figure 3 is an enlarged vertical section through the spring, spring-bar, and front axle, showing the mode of connecting the reach to the front axle.

Figure 4 is an enlarged sectional view, showing the manner of connecting the rear spring to the wagon-body.

Figure 5 is a top view of the head-block and slider.

Similar letters of reference indicate corresponding parts in the several figures.

This invention relates to certain novel improvements on the construction of the running-gear of all kinds of four-wheel vehicles having their bodies mounted upon springs, and is designed to prevent the racking and straining of the running-gear, caused by the hitherto rigid attachment of some of the parts composing it.

The nature of my invention consists in interposing a joint-connection between the axle and spring, or between the spring and bed or body of a vehicle, either at the front or the rear end thereof, which connection shall prevent injurious shocks, in riding over stony or uneven ground, by preventing the vibrations of the axles from being imparted to the body or bed of the vehicle, as will be hereinafter explained.

The invention also consists in attaching the reach or coupling-bar of the two axles to one of these axles, in such manner as will prevent this coupling from being twisted or strained, in consequence of the vertical vibrations of said axles, as will be hereinafter explained.

The invention also provides for relieving the friction between the sliders of a vehicle, by the interposition of anti-friction rollers between them, as will be hereinafter described.

To enable others skilled in the art to understand my invention, I will describe its construction and operation.

In the accompanying drawings, A is the wagon-body, B B' the springs which are interposed between the body and the axles, C C' are the axles, and D is the reach or coupling-bar connecting together the two axles. The front axle C is connected to the head-block E by means of a king-bolt, $a$, so as to allow this axle a horizontal vibration; and between this block and its axle are the sliders $b$ $b'$, one of which is secured to the axle, and the other is secured to or formed on the bottom section of the head-block E. In order to relieve the sliders from undue friction, I employ anti-friction rollers $c$ $c$, which may be pivoted to the block E, or to the lower slider $b$. These rollers afford rolling supports, and prevent the friction caused by sliders working close together, as hitherto employed. The block E is constructed of three longitudinal sections, divided vertically and horizontally, which sections enclose a socket for receiving a cylindrical head, $d$, formed on the front end of the reach or coupling-bar D, as shown in fig. 3. Between the head-block E and the wagon-body or spring-bar, an elliptic spring is interposed, which is lettered B. This spring is rigidly bolted to the block E, and also to the wagon-body A, and it is arranged in a direction with the length of the axle, as shown. The rear spring B' is secured firmly to the rear axle, and connected to the spring-bar or wagon-body, by means of a joint, so that said rear axle shall be allowed to vibrate, in a vertical plane, independently of the wagon-bed or body.

The drawings represent the joint interposed between the spring and wagon-body, but, if desirable, this joint may be interposed between the spring and axle. I prefer to make the joint in the following manner: A flat plate, F, is secured firmly to the spring-bar or wagon-bed, by means of bolts, the heads of which are countersunk into the bottom surface of this plate. In the middle of the length of this plate two ear-pieces, $e$ $e$, project down from its front and rear edges, which are perforated for receiving the pivot coupling-pin $f$. G represents another plate, which is firmly bolted to the spring B' by means of bolts, the heads of which are countersunk into the upper side of this plate, as shown in fig. 4. Plate G is slightly less in width, and about equal in length to the plate F, so that it will lie between the lugs or ear-pieces $e$ $e$ of the latter plate. At the extremities of the plate G lugs *g g* are formed, which extend downward and support this plate upon the spring B', and near the middle of the length of this plate lugs *g' g'* are formed, on its bottom surface, which leave a vertical slot between them, which is slightly greater in width than the coupling-pin *f* that passes through this slot. The bolt-holes through the two plates F and G are made oblong, for the purpose of adapting the plates to different vehicles, or to different springs.

It will be seen from the above description of my improved joint, that it is applicable to the front or rear part of a vehicle, and that it can be applied either between the front or rear spring and axle, or between the spring and wagon-bed or body. The joint which I have described will prevent undue lateral or longitudinal play or looseness, and will, at the same time, prevent the lateral rocking and jolting motions of the wagon-body, which are so unpleasant to persons riding over rough roads in vehicles as hitherto constructed.

The wagon-body should be firmly secured to one of the springs B or B', so that it will be supported in a horizontal position. The reach or coupling-bar D is secured firmly to the rear axle in the usual manner, but connected to the head-block E, as above described, so as to oscillate freely in said block. In rear of the block E the cylindrical portion of the reach passes through a bearing, *h*, which rises from the upper slider, as shown in figs. 1, 3, and 5. By this mode of attaching the reach, it is allowed to oscillate freely, and is thus prevented from being twisted or strained.

Having described my invention, what I claim as new, and desire to secure by Letters Patent, is—

1. Interposing a joint between the spring and the body or axle of a vehicle, either at the front or rear end thereof, said joint being so constructed as will allow one of the axles to vibrate vertically and independently of the body or bed of the vehicle, substantially as described.

2. Connecting the coupling-bar or reach of a vehicle at one end, by means of a swivel-joint, so as to prevent said reach from being twisted or strained by the motions of the axles, substantially as described.

3. The combination of a joint-pin, *f*, placed between one of the axles and the body of a vehicle, with a reach, which is connected at one end by a swivel-joint, substantially as described.

4. The application of anti-friction rollers, *c c*, to the sliders *b b'*, substantially as described.

5. The sectional head-block E, constructed with a recess in it for receiving a head and neck, which is formed on one end of the reach, substantially as described.

6. The construction of plates F and G, substantially as described, so as to form with pin *f* a loose pivotal connection between the axle and body of a vehicle.

7. The bearing *h*, rising from slider *b'*, and adapted to serve the purpose described.

Witness my hand, in the matter of my application for a patent for improvements in the running-gear of vehicles.

DAN'L D. GITT.

Witnesses:
R. T. CAMPBELL,
JOHN S. HOLLINGSHEAD.